United States Patent [19]

Buchy et al.

[11] Patent Number: 5,818,043
[45] Date of Patent: Oct. 6, 1998

[54] BOLOMETRIC THERMAL DETECTOR

[75] Inventors: François Buchy, Villepreux; Philippe Robin, Bourg La Reine, both of France

[73] Assignee: Thomson-CSF, Paris, France

[21] Appl. No.: 897,836

[22] Filed: Jul. 21, 1997

Related U.S. Application Data

[63] Continuation of Ser. No. 325,435, filed as PCT/FR94/00401, Apr. 11, 1994, abandoned.

[30] Foreign Application Priority Data

Apr. 9, 1993 [FR] France ................................. 93 04257

[51] Int. Cl.$^6$ ........................... H01L 27/01; H01L 31/02; H01L 27/14; G01J 5/02
[52] U.S. Cl. ........................ 250/332; 250/338.2; 374/177
[58] Field of Search ..................... 374/124, 137, 374/185, 177; 338/22 R, 22 SD, 25; 250/332, 338.2, 338.4

[56] References Cited

U.S. PATENT DOCUMENTS

| 3,637,532 | 1/1972 | Ramisch et al. | 338/22 R |
|---|---|---|---|
| 3,644,864 | 2/1972 | Hirsbrunner et al. | 338/25 |
| 3,996,168 | 12/1976 | Hoffmann et al. | 252/520 |
| 4,104,509 | 8/1978 | Van Bokestal et al. | 338/22 R |
| 4,117,328 | 9/1978 | Auphan | 250/338.2 |
| 4,575,631 | 3/1986 | Satchell | 250/332 |
| 4,853,538 | 8/1989 | Jackson | 250/338.4 |
| 5,122,666 | 6/1992 | Turnbull | 250/338.2 |
| 5,281,845 | 1/1994 | Wang et al. | 338/22 SD |
| 5,297,438 | 3/1994 | Alles et al. | 374/185 |
| 5,367,282 | 11/1994 | Clem | 338/22 R |
| 5,512,748 | 4/1996 | Hanson | 250/332 |
| 5,559,332 | 9/1996 | Meissner et al. | 250/338.2 |

FOREIGN PATENT DOCUMENTS

| 2152750 | 8/1985 | United Kingdom | 374/177 |
|---|---|---|---|
| 93/09414 | 5/1993 | WIPO | 250/332 |

*Primary Examiner*—Diego F.F. Gutierrez
*Attorney, Agent, or Firm*—Oblon, Spivak, McClelland, Maier & Neustadt, P.C.

[57] ABSTRACT

A thermal imaging detector including a layer of heat-sensitive material which includes a doped ferroelectric material exhibiting a pronounced rise in resistance with temperature in the vicinity of the ferroelectric/paraelectric transition, a multiplexing circuit, a thermally insulating thin-film microstructure, and a matrix segmentation at the level of the material of the heat-sensitive layer, so as to define heat-sensitive picture elements.

11 Claims, 3 Drawing Sheets

BOLOMETRIC THERMAL DETECTOR

This application is a Continuation of application Ser. No. 08/325,435, filed on Nov. 9, 1994, now abandoned, which is a Rule 371 of PCT/FR94/00401, filed Apr. 11, 1994.

BACKGROUND OF THE INVENTION

1. Field of the Invention

The field of the invention is that of thermal detectors and, more precisely, that of non-cooled infrared thermal detectors.

2. Discussion of the Background

These detectors generally include a sensitive element which may be heated by a flux of radiation in the III band (8 to 12 $\mu$m), characteristic of the temperature and emissivity of the observed bodies. The increase in temperature of the sensitive element is manifested by a variation in an electrical property of the material of which the sensitive element is composed: appearance of electrical charges by a pyroelectric effect, variation in the capacity by a change in the dielectric constant, or a variation in the resistance of a semiconductor material.

Satisfactory operation of these detectors involves three principal conditions as regards the sensitive material: a low thermal mass (and therefore thin-film operation), good thermal insulation of the active layer with respect to the measurement substrate and especially a high sensitivity to the effect of converting heating into an electrical signal.

Compared to first-generation examples having a tube of the pyricon type, the major development has been the production of monolithic detectors integrating an array of sensitive elements connected directly to a CCD- or CMOS-type silicon multiplexing circuit. Infrared imagers functioning at ambient temperature are nowadays produced by making use of novel pyroelectric or ferroelectric materials (like fluoropolymers or lead perovskites, etc.).

Certain compounds, such as vanadium dioxide, have emerged as being particularly interesting because of their high sensitivity due to large variations in resistivity. In the case of these materials, constant-current measurements are generally carried out in order to read voltage variations representative of recorded infrared radiation. In fact, compounds such as the semiconductors or vanadium dioxide exhibit negative temperature coefficients (decrease in resistance with an increase in temperature). Constant-current measurement is essential since, with a constant-voltage measurement, an increase in current, and therefore a temperature rise within the sensitive layer, due to the Joule effect, is obtained with compounds having a negative temperature coefficient. These materials thus cannot have a regulated temperature because they experience thermal runaway when recording infrared radiation under constant-voltage conditions. However, it may be particularly advantageous to carry out reading at constant voltage since the overall size of the electronic circuits to be established on the silicon is generally smaller and the operation of the electronic devices used is often less noisy.

SUMMARY OF THE INVENTION

Accordingly, one object of this invention is to provide a novel thermal detector in which the layer of sensitive material possesses a positive temperature coefficient (PTC). Thus, during a constant-voltage measurement, the rise in resistance with temperature generates a decrease in current, making it possible to minimize the Joule-effect losses and thus to stabilize the temperature of the sensitive layer in a voltage-biased PTC material, the current is self-regulating; thermal runaway is avoided. More precisely, the subject of the invention is a thermal detector comprising a layer of heat-sensitive material, characterized in that the sensitive material comprises a doped ferroelectric material exhibiting a pronounced rise in resistance with temperature in the vicinity of the ferroelectric/paraelectric transition (PTC).

With this type of material, it is possible to optimize the value of the resistance and the temperature coefficient dR/dT (R being the resistance of the layer of sensitive material, T being the temperature). In fact, it has been endeavoured to minimize the value of the resistance and to obtain a high temperature coefficient. The low resistance value necessary for good sensitivity may be provided by doping, thus making it possible to obtain a ferroelectric phase of low resistance.

The sensitive material may be a doped ferroelectric ceramic.

The ferroelectric ceramic may advantageously be barium titanate $BaTiO_3$ or a compound of the $BaTiO_3$—$SrTiO_3$ type.

By using a compound such as $BaTiO_3$—$SrTiO_3$ with variable amounts of $SrTiO_3$, it is possible to influence the switch temperature corresponding to the change in slope between the ferroelectric phase and the paraelectric phase in the curve of resistance as a function of temperature, shown diagrammatically in FIG. 1. It is thus possible advantageously, with a ceramic containing approximately 30% of $SrTiO_3$, to obtain a sensitive detector operating at ambient temperature. In fact, in this specific case, the switch temperature is located around 20° C.

Doping, enabling the resistance value to be adjusted, may be provided by compounds such as antimony, yttrium or the rare earths (lanthanum, neodymium, samarium, dysprosium, terbium, etc.). The percentage of dopant may typically be between 0.1% and 1%.

The sensitive material may be a composite material comprising a layer of doped ferroelectric material and a semiconductor layer.

Typically, this may be a combination of a doped ferroelectric layer and a gallium arsenide or amorphous silicon layer.

The thermal detector according to the invention may comprise a substrate which includes a multiplexing circuit, a thermally insulating thin-film microstructure and a matrixed segmentation at the level of the sensitive layer, so as to define picture elements or pixels.

The insulating microstructure may advantageously be composed of microbridges made of insulating material, of the silicon nitride type.

Each microbridge may thus support an individual element of sensitive material, made of ferroelectric ceramic. The electrodes necessary for the electrical measurement may advantageously be of the type in which planar electrodes are arranged on the surface of the individual ceramic elements. They may also be of the type in which transverse electrodes are located on the side walls of a sensitive element, while partially covering the upper face of the said element.

BRIEF DESCRIPTION OF THE DRAWINGS

The invention will be better understood and other advantages will appear from reading the description which follows, given in a manner implying no limitation, and from the appended figures in which.

DETAILED DESCRIPTION OF THE PREFERRED EMBODIMENTS

Figure 1:
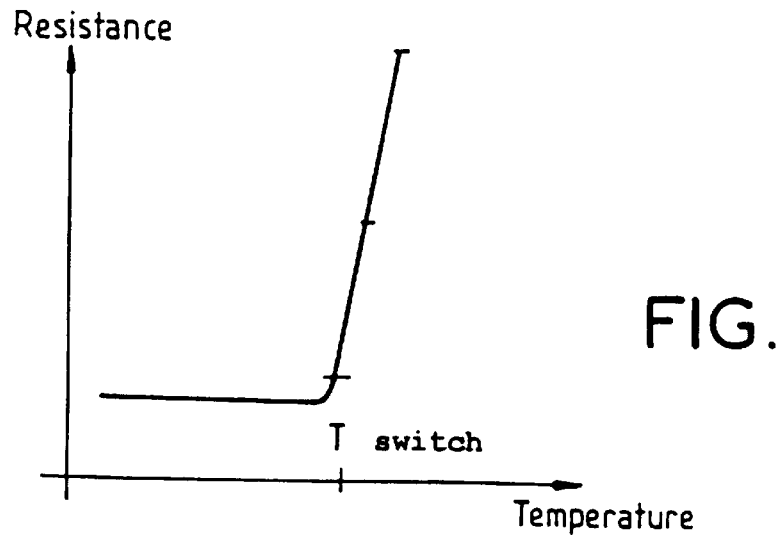
FIG. 1 shows diagrammatically the change in the resistance with temperature in a ferroelectric ceramic used as the sensitive material in a thermal detector according to the invention.

The thermal detector according to the invention comprises a sensitive layer of a ferroelectric ceramic having a high positive temperature coefficient. The effect of the variation in resistance as a function of temperature is connected with the presence of interfaces in this type of material, especially grain-boundary interfaces in a ceramic microstructure. Thus, in the vicinity of the ferroelectric/paraelectric transition, there is a pronounced rise in resistance with temperature, as illustrated in FIG. 1. This rate of increase may typically reach 100% per degree and this is so over a limited temperature interval. The switch temperature defined in FIG. 1 is determined by the synthesis of the material and may typically be between −100° C. and +300° C.

It may thus be particularly beneficial to use thermal detectors operating at ambient temperature without any cooling system.

In a thermal detector according to the invention, the resistivity values in the conducting state are a function of the level of doping introduced into the sensitive material. Typically, in the case of barium titanate, resistivities below approximately 100 Ω.cm may be obtained.

In order to influence the temperature coefficient, it is also possible to introduce another type of dopant, which may be manganese, at very low percentages, less than approximately 0.1%.

The infrared thermal detector may comprise an architecture making it possible to perform infrared imaging. This may be an architecture of the matrix type composed of N×M elementary picture elements (pixels) where N and M are, respectively, the number of rows and columns.

Figure 2A:
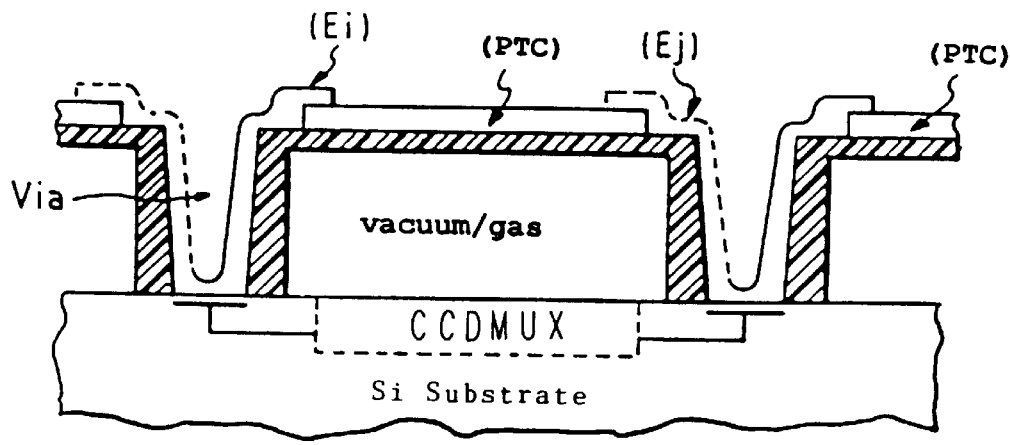
FIGS. 2a and 2b illustrate, respectively, a sectional view and a plan view of an example of a thermal detector according to the invention, including a matrix of image pixels.
Figure 2B:
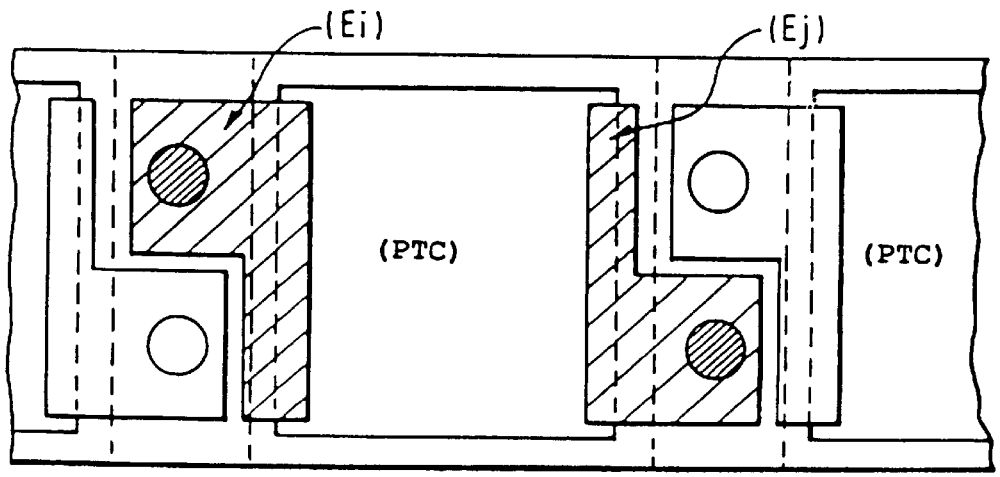

This matrix segmentation may exist at two levels, as illustrated in FIGS. 2a and 2b:

at the level of the plane of the heat-sensitive layer and at the level of the electrical measurement of each pixel;

at the level of the measurement plane which may be a CCD multiplexing circuit MUX produced in a silicon substrate, as schematically shown in FIG. 2a.

Figure 3A:
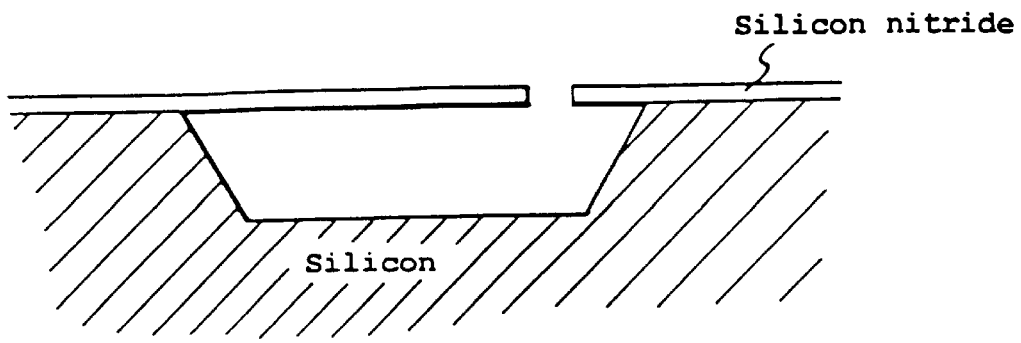
FIGS. 3a and 3b illustrate embodiment examples of the insulating microstructure with FIG. 3a illustrating a silicon-etching technique FIG. 3b illustrating a technique using the deposition of a sacrificial layer.
Figure 3B:
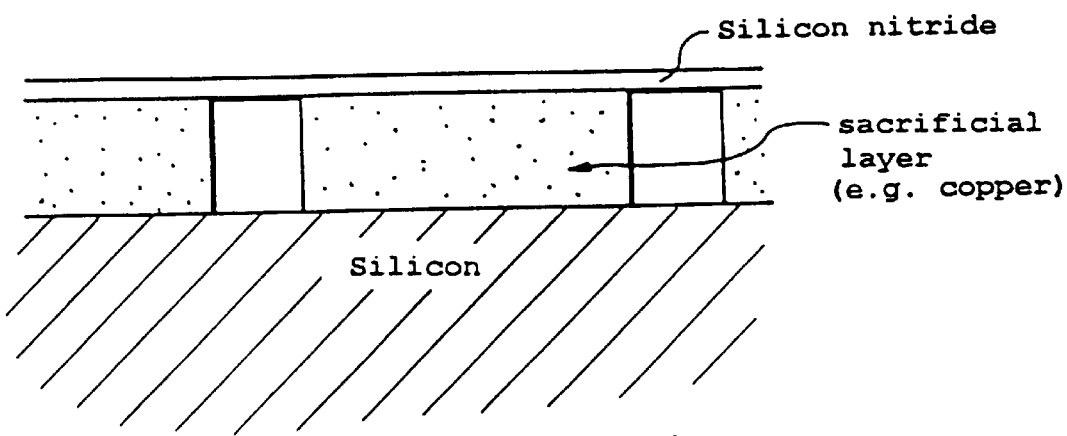

In order to obtain effective thermal insulation of the matrix of sensors with respect to the silicon substrate, the detector according to the invention comprises a thin-film microstructure. This microstructure may be fabricated in various ways: for example by silicon-etching techniques, leaving a thin insulating support layer, as illustrated in FIG. 3a. The thin insulating support layer may typically be made of silicon nitride. Another possible technique may consist in depositing a sacrificial layer which will be chemically etched (as illustrated in FIG. 3b). This sacrificial layer may typically be made of copper.

The thin layers of sensitive elements of the type made of ceramic material with a positive temperature coefficient are then deposited on these microbridges with the aid of deposition techniques, known for this type of material: sputtering, laser ablation, sol-gel method, etc.

An etching step makes it possible physically to separate the sensitive elements so that their resistances may be read independently.

In order to read the information, two electrode geometries may be employed:

a geometry with transverse electrodes on the two side walls of the active elements;

a geometry with planar electrodes on the upper and lower surfaces of the active elements.

These types of electrodes for a thermal sensor according to the invention, produced in this way, may be connected to the input stage of the read circuit beneath each pixel.

The thermal detector according to the invention, made in this way, may advantageously be encapsulated under vacuum or under another gas, such as xenon, in order to gain in thermal decoupling efficiency. The package thus fabricated then comprises a III band transmission window.

Production of sensitive elements having a positive temperature coefficient

Various compounds, which are ferroelectric in the vicinity of ambient temperature, may be used, but a preferred embodiment will be based on a solid solution of barium titanate and of strontium titanate.

The starting constituents for the synthesis comprise, in addition to the elements of the solid solution, one or more of the additives mentioned above: e.g.: 0.4% in atomic proportion of yttrium oxide in order to render the compound semiconducting; and 0.04% of manganese oxide in order to control the temperature coefficient of the resistance.

Figure 4:
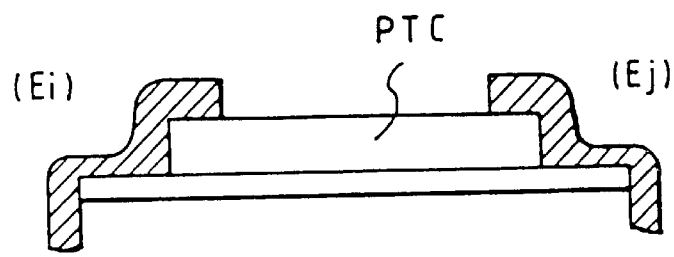
FIG. 4 illustrates one example of the configuration of measurement electrodes in a thermal detector according to the invention.
Figure 5:
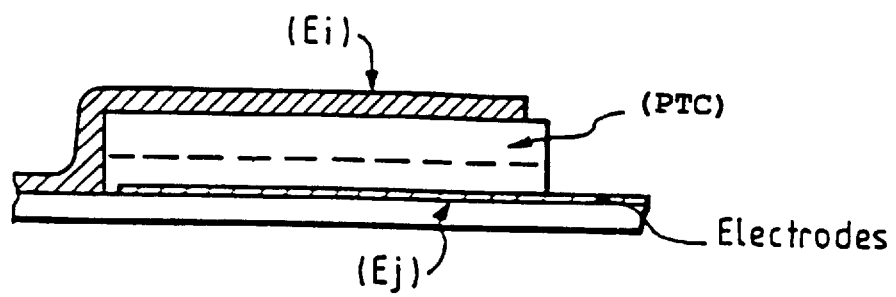
FIG. 5 illustrates another example of a configuration of measurement electrodes in a thermal detector according to the invention.
Figure 6:
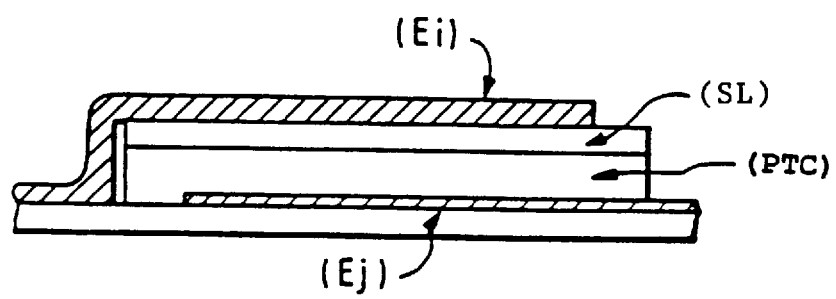
FIG. 6 illustrates an example of a detector according to the invention in which the sensitive element consists of a layer of doped ferroelectric material and of a semiconductor layer.

The following structures may be employed for controlling the value of the resistance and the value of the slope of the resistance as a function of temperature:

deposition of a polycrystalline thin layer, the microstructure of which will be controlled by the deposition parameters so as to obtain an average grain size markedly smaller than the pixel dimension so as to incorporate several grain boundaries between the electrodes. Planar electrodes are combined with this structure (see FIG. 4);

deposition of a multilayer-type structure, for which FIG. 5 illustrates a simple embodiment defining a potential barrier favourable to the PTC effect: deposition of a first doped ferroelectric layer, for example by sol-gel, followed either by a treatment in an oxidizing atmosphere or deposition of an acceptor element: Mn, Fe, etc., and then deposition of a second ferroelectric layer under the same conditions as the first. Next, two transverse electrodes are deposited on the two faces (see FIG. 5);

deposition of a thin doped ferroelectric layer (PTC) as previously, followed by the deposition of a thin semiconductor layer (SL), for example made of gallium arsenide or amorphous silicon, and metallization of the two faces as previously explained (FIG. 6) in order to define the electrodes (Ei) and (Ej).

We claim:

1. Thermal imaging system comprising:
   a layer of heat-sensitive material which comprises a doped ferroelectric material exhibiting a pronounced rise in resistance with temperature in the vicinity of the ferroelectric/paraelectric transition,
   a substrate, a multiplexing circuit formed on said substrate,
   a thermally insulating thin-film microstructure formed on said substrate and on which said layer of heat-sensitive material is formed,
   a matrix segmentation at the level of the layer of heat-sensitive material, so as to define heat-sensitive picture elements coupled to said multiplexing circuit,
   said microstructure including plural microbridges formed of an insulating material and each microbridge supporting a respective heat-sensitive picture element and insulating said respective heat-sensitive picture element from said substrate; and
   a constant voltage measurement circuit which applies a constant voltage to each of said heat-sensitive picture elements and which measures a change in resistance of each of said heat-sensitive picture elements as a change in current flowing through each of said heat-sensitive picture elements.

2. Thermal imaging system according to claim 1, wherein the sensitive material is a doped ferroelectric ceramic.

3. Thermal imaging system according to claim 2, wherein the doped ferroelectric ceramic comprises barium titanate.

4. Thermal imaging system according to claim 3, wherein the doped ferroelectric ceramic further comprises strontium titanate.

5. Thermal imaging system according to claim 1, wherein the sensitive material comprises a layer of doped ferroelectric material and a semiconductor layer.

6. Thermal imaging detector according to claim 1, wherein the doping is provided by a material selected from the group consisting of antimony, yttrium, manganese, and the rare earth materials.

7. Thermal imaging system according to claim 6, wherein the percentage of dopant is between approximately 0.1% and approximately 1%.

8. Thermal imaging system according to claim 1, wherein the insulating material is silicon nitride.

9. Thermal imaging system according to claim 8, wherein said ferroelectric material of said heat sensitive picture element is a ceramic.

10. Thermal imaging system according to claim 9, further comprising planar electrodes arranged on a lower surface and on an upper surface of said respective heat sensitive picture elements.

11. Thermal imaging system according to claim 9, further comprising electrodes located on side walls of the sensitive elements and also partially covering upper faces of said elements.

* * * * *